July 24, 1923.

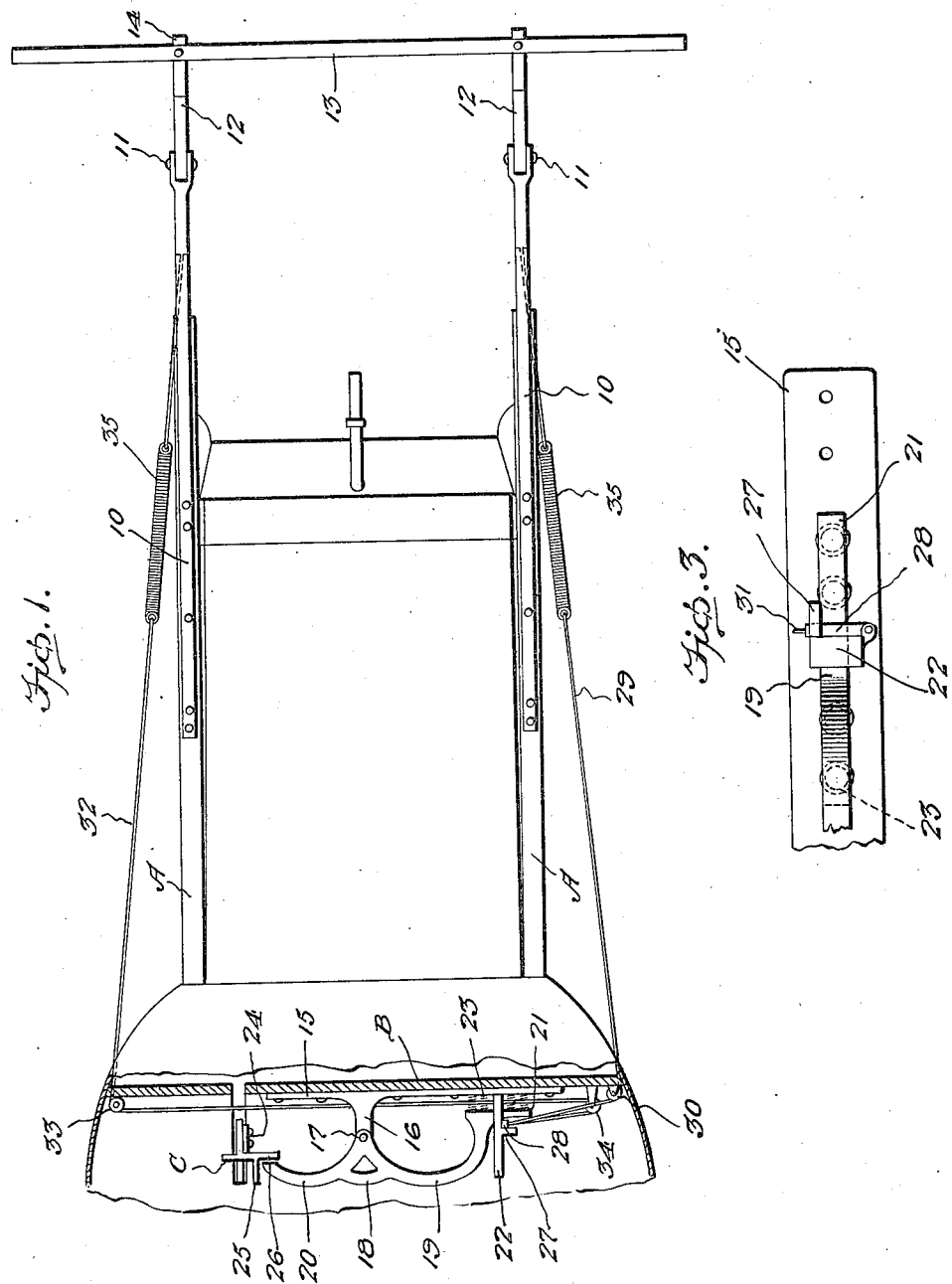

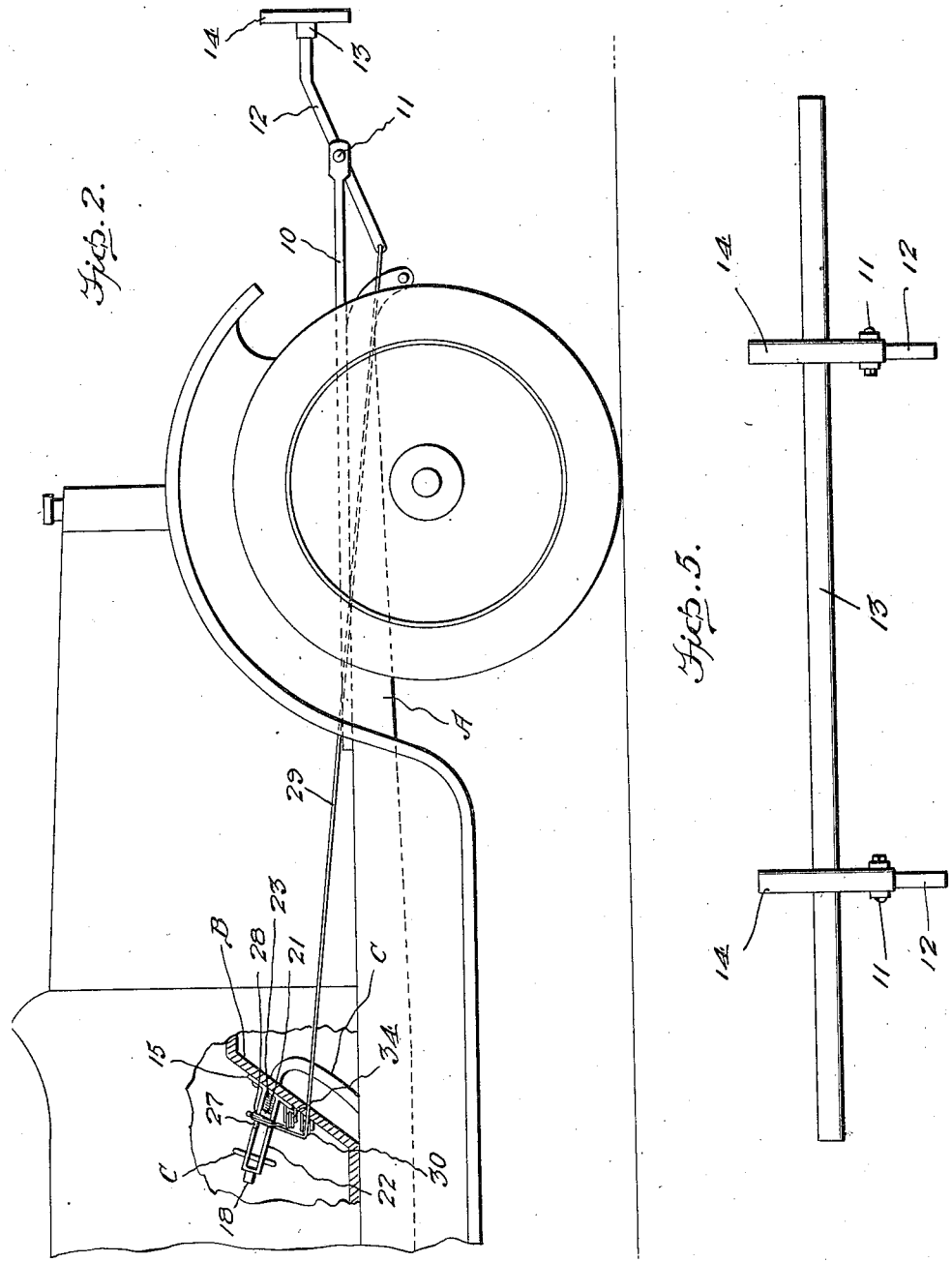

J. E. AMADOR

SAFETY FENDER FOR AUTOMOBILES

Filed Oct. 17, 1921

J. E. Amador
INVENTOR

BY Victor J. Evans
ATTORNEY

WITNESS: Paul M. Hunt

Patented July 24, 1923.

1,462,928

UNITED STATES PATENT OFFICE.

JOSEPH E. AMADOR, OF NEW YORK, N. Y.

SAFETY FENDER FOR AUTOMOBILES.

Application filed October 17, 1921. Serial No. 508,182.

*To all whom it may concern:*

Be it known that I, JOSEPH E. AMADOR, a citizen of the United States, residing at New York, in the county of New York and State of New York, have invented new and useful Improvements in Safety Fenders for Automobiles, of which the following is a specification.

This invention relates to attachments for motor vehicles, particularly to safety bumpers or fenders, and has for its object the provision of a device mounted upon the front of an automobile and having a novel connection with the brake mechanism whereby to automatically set the brakes in the event that the automobile should collide with a pedestrian or another vehicle.

An important and more specific object is the provision of a device of this character which includes a spring pressed hammer-like device associated with the emergency brake control pedal, this hammer device being normally held inoperative and being automatically released in the event of a collision with a person or in fact any object so as to set the brakes.

Another object is the provision of novel trip means which normally holds the brake actuating device inoperative with the operating springs thereof under pressure.

Still another object is the provision of a novel bumper device which is movably mounted so that forcible contact thereof at any point with an object will effect the setting of the brakes.

An additional object is the provision of a device of this character which will be comparatively simple and inexpensive in manufacture, easy to install, which will not interfere with the ordinary operation of the brakes, which will be efficient and positive in action, durable in service and a general improvement in the art.

With the above and other objects and advantages in view, the invention consists in the details of construction to be hereinafter more fully described and claimed, and illustrated in the accompanying drawings in which:

Figure 1 is a plan view of the front portion of an automobile chassis showing my device associated therewith.

Figure 2 is a side view with a portion of the body broken away and the floor boards in section.

Figure 3 is a fragmentary bottom plan view.

Figure 5 is a detail front elevation of the bumper bar.

Figure 4:
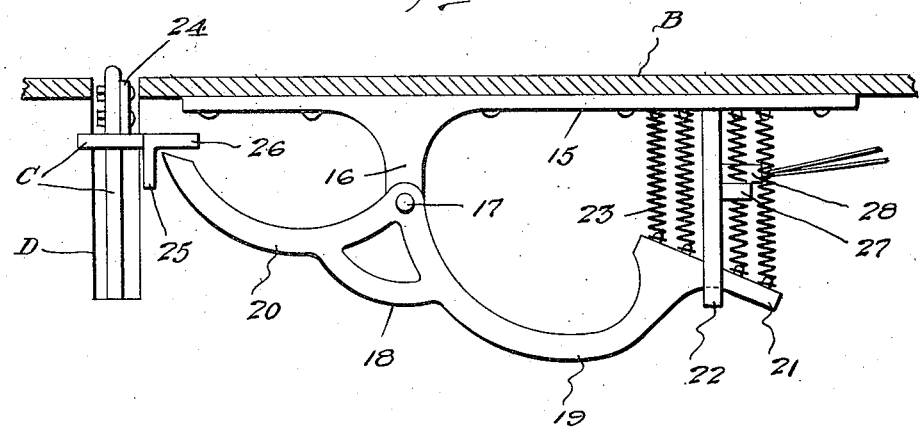
Figure 4 is a sectional view showing an elevation of the hammer mechanism in operated position.
Figure 6:
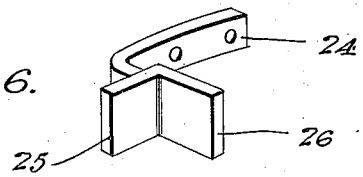
Figure 6 is a detail view of the member secured to the brake pedal.
Figure 7:
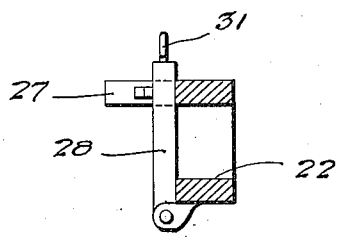
Figure 7 is a detail cross sectional view showing the guide for the hammer device.
Figure 8:
Figure 8 is a detail view showing the trigger mechanism.

Referring more particularly to the drawings, the letter A designates the frame bars of an automobile, B designates the floor board or the dash as the case might be depending upon the length of the vehicle to which the device is to be applied. The letter C designates the emergency brake pedal which is of course associated with the usual brake mechanism in the ordinary way, it being believed unnecessary to illustrate the brake mechanism though it should be understood that the brakes are set by depressing the pedal C. The pedal operates through the usual slot D.

In carrying out my invention I provide bars 10 which are secured upon the frame bars A at the forward ends thereof and which project beyond the forward ends. These bars 10 may be secured in position by any suitable means such as screws, bolts or the like, such detail making no difference. Pivoted at 11 upon the forward ends of the bars 10 are angular forwardly and upwardly inclined arms 12 which have their forward ends connected by a cross bar 13 upon which I prefer to secure vertically extending short bar members 14. From this construction it will be seen that if the bar 13 should strike against an object either one or both of the arms 12 will swing upon the pivot 11.

Suitably secured upon the floor board or dash B, as the case might be, is a supporting member 15, which carries a depending bracket 16 upon which is pivoted, as shown at 17, a hammer indicated generally by the numeral 18. This hammer member is of peculiar construction and shape and includes oppositely extending curved arms 19 and 20. The arm 19 is formed with a lateral extension 21 which is movable within a slotted guide 22 which is either formed upon or secured to the support 15. The extension 21 carries a plurality of suitably supported coiled springs 23 which engage against the rear side support 15.

Secured upon the brake pedal C is an anvil device including a suitable body 24 which may be secured to the brake pedal by any suitable means such as a clamp or the like or which may be formed integrally upon the pedal. Formed on this body is a flange 25 which extends alongside the foot engaging portion of the pedal so as to prevent the operator's foot from coming in contact with the hammer device. The body 24 is formed with a lateral extension 26 against which the end of the arm 20 of the hammer device engages.

Provided upon the guide 22 is a lateral lug 27 which acts as a keeper for a pivoted trigger bar 28 which is designed to bridge the slot in the guide member 22 to serve as retaining means for holding the extension 21 of the hammer member against movement with the springs 23 under compression.

Connected with the lower end of one arm 12 is a flexible member 29, such as a wire or cable, which extends rearwardly about a guide pulley or roller 30 and which is connected with a ring 31 on the end of the trigger 28. Connected with the lower end of the other arm 12 is a similar flexible member 32 which is trained about a guide roller 33 at one side of the frame, then across the frame and about a second guide roller 34 and which has its end likewise connected with the ring 31. Interposed in the cables or wires 29 and 32 are strong springs 35 for the purpose of preventing breakage in case of severe strain.

Assuming that the device has been constructed and assembled as above described, the operation is as follows:—The mechanism is set by swinging the hammer member 18 so that the extension 21 thereof will be forced toward the support 15 placing the springs 23 under compression. The trigger or latch 28 is then swung to extend across the slot in the guide 22, this trigger engaging behind the extension 21 and in front of the keeper lug 27 for holding the hammer member against movement. The flexible members 29 and 33 will then be held taut. In the event of a collision of any kind which will cause the application of pressure to the bar 13 either or both arms 12 will be swung upon the pivot 11 whereupon a pull will be exerted upon the associated flexible member 29 or 32 or upon both flexible members in case the bar 13 is struck at its center. When a pull is exerted upon either flexible member the trigger member 28 will be swung down out of engagement with the keeper lug 27 and of course out of engagement with the extension 21 which will result in allowing the springs 23 to swing the hammer member 18 violently so that the end of the arm 20 thereon will forcibly engage against the extension 26 of the anvil member and move the pedal C forwardly and downwardly to its brake setting position so that the vehicle will be stopped almost instantly before any great harm could result from the collision. The vertical bars 14 are provided for the purpose of rendering the device operative in case a collision should occur between two vehicles equipped with my device. After the device has once been operated it must of course be manually reset and it is to be noted that the device when in set position does not interfere with the ordinary operation of the brakes.

From the foregoing description and a study of the drawings, it will be apparent that I have thus provided a simply constructed and easily applied device which will automatically operate to set the emergency brakes of a vehicle in case of any collision whatever so that the vehicle will come to practically an instantaneous stop without any voluntary action on the part of the driver or operator. It will be observed that the mechanism is easily reset and that it will not interfere with the usual operation of the vehicle and will not detract from the appearance.

While I have shown and described the preferred embodiment of the invention it is of course to be understood that I reserve the right to make such changes in the form, construction and arrangement of parts as will not depart from the spirit of the invention or the scope of the subjoined claims.

Having described the invention I claim:—

1. A safety device for motor vehicles comprising the combination with the brake setting pedal, of an anvil member carried by the pedal, a hammer member pivoted intermediate its ends and having one end engageable with said anvil, springs engaging the other end of the hammer for urging the first mentioned end forcibly against the anvil, a slotted guide for the second mentioned end of the hammer, a catch device pivotally mounted on said guide and engaging behind the second named arm of the hammer device, and collision released means for withdrawing said catch device from engagement with the hammer.

2. A safety device for motor vehicles comprising the combination with the brake setting pedal, of an anvil member carried by the pedal, a hammer member pivoted intermediate its ends and having one end engageable with said anvil, springs engaging the other end of the hammer for urging the first mentioned end forcibly against the anvil, a slotted guide for the second mentioned end of the hammer, a catch device pivoted on said guide and engaging behind the second named arm of the hammer device, and collision released means for withdrawing said catch device from engagement with the hammer, said means comprising a bumper structure pivoted upon the front end of the vehicle and flexible members connected with said bumper structure, trained about guide rollers and connected with said catch member.

In testimony whereof I affix my signature.

JOSEPH E. AMADOR.